May 16, 1950     W. R. CLARK     2,507,590
ELECTRON BEAM SELF-BALANCING MEASURING SYSTEM
Filed May 9, 1946     3 Sheets-Sheet 1

INVENTOR
WILLIAM RUSSELL CLARK
BY
Woodcock and Phelan
ATTORNEYS

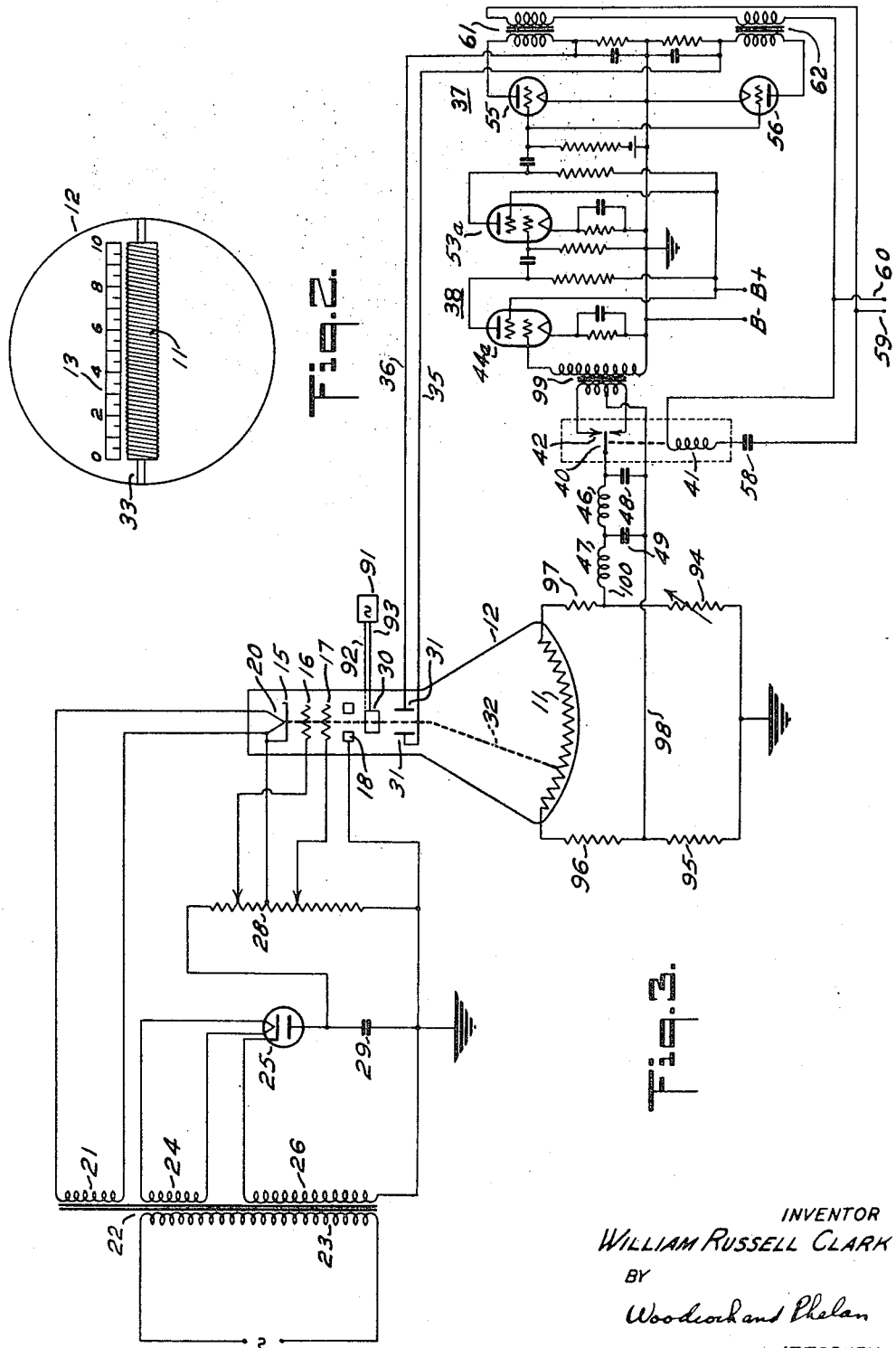

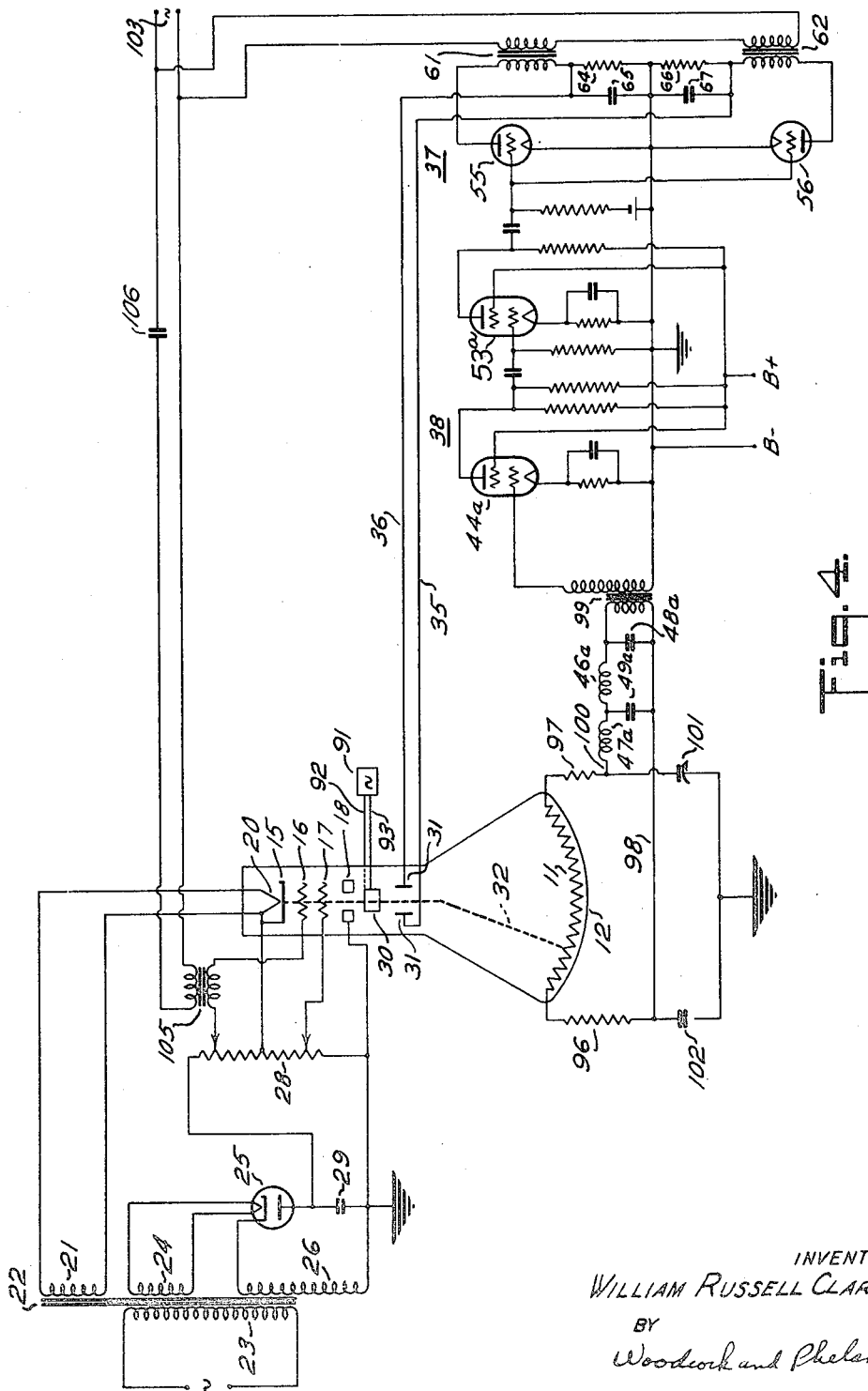

Patented May 16, 1950

2,507,590

UNITED STATES PATENT OFFICE 2,507,590

ELECTRON BEAM SELF-BALANCING MEASURING SYSTEM

William Russell Clark, Jenkintown, Pa., assignor to Leeds & Northrup Company, Philadelphia, Pa., a corporation of Pennsylvania Application May 9, 1946, Serial No. 668,623

15 Claims. (Cl. 177—351)

This invention relates to electrical measuring systems for determining the magnitude of a condition of electrical, chemical, or physical nature, and has for an object the provision of a measuring system and indicator in which a balanceable network is balanced coincidentally with a change in the magnitude of the condition under measurement.

In carrying out the present invention in one form thereof, there is provided a measuring system comprising an electron-beam tube for producing an electron beam directed toward a target formed by an elongated impedance, as, for example, a resistor disposed within the tube. The resistor or impedance is included in a network balanceable by movement of the beam to a predetermined position with respect to the resistor. There is provided means for unbalancing the network in response to variations in the magnitude of the condition. This means may take the form of a thermocouple, or other forms of condition-responsive devices may be utilized. There is also provided means responsive to unbalance of the network for deflecting or moving the beam to a network balancing position with respect to the impedance or resistor. The system has the advantage of fast action, without inclusion of moving parts. As applied to a Wheatstone bridge, a variation in resistance or impedance may be balanced by movement of the electron beam oppositely to change the amount of resistance included in adjacent arms of the bridge. An important feature of the invention includes the use of the beam additionally to provide an indication of its position on or with respect to the resistor or impedance element with which there may be associated a calibrated scale for direct reading of magnitudes of the condition.

For a more detailed description of the invention and for further objects and advantages thereof, reference may be had to the following description taken in conjunction with the accompanying drawings, in which:

Fig. 1 diagrammatically illustrates a measuring system of the potentiometer type embodying the invention;

Fig. 2 is a front view of the electron-beam tube showing the impedance element and its associated scale;

Fig. 3 is a schematic wiring diagram embodying the invention as applied to the Wheatstone bridge of the direct-current type; and Fig. 4 is a schematic wiring diagram illustrating the invention as applied to a Wheatstone bridge of the alternating-current type.

Figure 1:
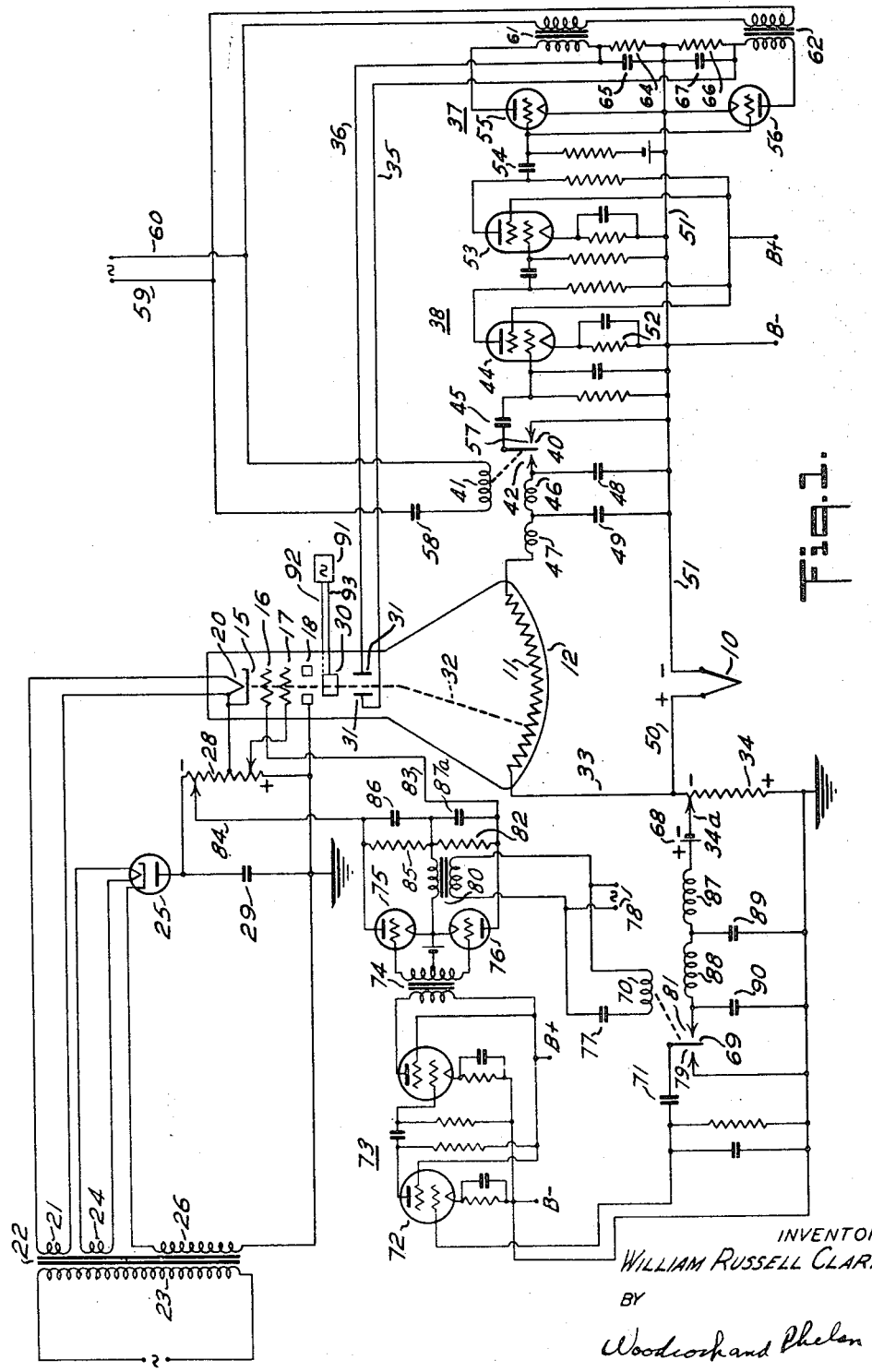

Referring to the drawings, the invention in one form has been shown as applied to the measurement of the magnitude of a condition, such, for example, as temperature, a thermocouple 10 being provided for this purpose. As is well understood by those skilled in the art, the thermocouple 10 will produce a potential difference, the magnitude of which will vary in accordance with temperature. The potential difference is of small magnitude, and a sensitive system must be provided to measure it accurately. In accordance with Fig. 1, there is provided a resistor 11 disposed within an electron-beam tube 12 as the target thereof. It will be observed, Fig. 2, that the resistor 11 is elongated and extends substantially all the way across the enlarged end of the electron-beam tube 12. The width of the resistor 11 is limited so there is ample room for the provision of a scale 13 on one side thereof. The scale 13 is calibrated in terms of the magnitude of the condition under measurement. Preferably, there is provided a slight space between the adjacent edges of the resistor 11 and the scale 13.

The electron-beam tube 12 may be of any suitable type, of which there are several on the market. As illustrated, Figs. 1, 3, and 4, it is of the cathode-ray type, where a stream of electrons is derived from a cathode 15. The intensity of the beam of electrons is controlled by a control electrode 16. It functions in a manner similar to the control grid of a conventional vacuum tube. There is also provided an accelerating electrode 17 which is sometimes referred to as the first anode. The stream of electrons moving from the cathode toward the resistor-target 11 is focused into a beam by means of a focusing electrode 18, sometimes referred to as the second anode. A source of current supply for the filament 20 is provided by a secondary winding 21 of a supply transformer 22 having its primary winding 23 connected to a suitable source of alternating-current supply. The transformer is also provided with a secondary winding 24 for the filament supply of a rectifier tube 25 shown as a diode.

A third secondary winding 26 supplies current at a desired voltage which after rectification by the rectifier 25 forms the source of the direct-current potentials required by the electron-beam tube 12. The rectified direct current is derived from a voltage-dividing resistor 28, across which there is connected a capacitor 29 of large capacitance. The highest positive value of potential from resistor 28 is applied to the focusing electrode 18.

Though electromagnetic beam-deflecting coils may be utilized, the electron-beam tube 12 is provided with two pairs of electrostatic deflecting plates 30 and 31. Disregarding, for the moment, the function of the deflecting plates 30 and the other circuit components, the arrangement is such that the electron beam 32 is directed to strike the resistor 11 at a point such that the current flowing through the resistor 11 by way of conductor 33 produces a potential difference which effectively balances that produced by the thermocouple 10. The current path may be traced from the ground connection, which, it will be observed, is at the high-voltage end of resistor 28 and which is also at one end of the resistor 34, in consequence of which current flows through resistor 34, the conductor 33, the left-hand portion of resistor 11, by way of the electron beam 32, to the cathode 15 and to a point on the resistor 28 more negative than the grounded end thereof. By virtue of the flow of beam current from conductor 33 through the left-hand fraction of resistor 11, a potential difference is produced which is in opposition to that of thermocouple 10. Any difference between the two potential differences is applied by way of the right-hand fraction of resistor 11, filter inductors 47 and 46 and conductor 51 to capacitor 48. The periodic connection of capacitor 48 to the input circuit of the amplifier 38 applies thereto an alternating signal of phase determined by the polarity of the voltage appearing across capacitor 48.

The deflection or positioning of the electron beam 32 is accomplished by the application of a suitable direct-current voltage by way of conductors 35 and 36 connected respectively to the deflecting plates 31 and to the output of a pair of grid-controlled rectifiers 37. The rectifiers 37 are operated under the control of an amplifier 38 responsive to the difference in potential between the thermocouple 10 and that portion of the resistor 11 to the left of beam 32. A vibrating single-pole double-throw contact 40, operated by a coil 41, when in engagement with the contact 42 connects the grid of a vacuum tube 44, through a coupling capacitor 45 and a filter including inductors 46 and 47 and capacitors 48 and 49, to one side of resistor 11. The other side of resistor 11 is connected by conductor 50 to one side of the thermocouple 10. The opposite side of thermocouple 10 is connected by conductor 51 and cathode-biasing means 52 to the cathode of the tube 44. The amplifier 38 includes a second vacuum tube 53 as well as the usual and conventional circuit elements for a class A amplifier, a detailed description of which is not deemed necessary because it is well understood by those skilled in the art. The output from the amplifier 38 is applied by way of a coupling capacitor 54 to the grids of the rectifier tubes 55 and 56 comprising the rectifier 37.

When the vibrator contact 40 engages its other stationary contact 57, it serves to connect the grid of tube 44 to the cathode-biasing means 52. The result is that the tube 44 responds to the difference between the potential of the thermocouple 10 and that developed in that portion of the resistor 11 to the left of the beam 32 which as above stated appears across capacitor 48.

It will be observed that the vibrator operating coil 41 is connected by way of a capacitor 58 to supply lines 59 and 60 leading to a suitable source of alternating current. It will also be observed that supply transformers 61 and 62 respectively connected in the anode circuits of the grid-controlled rectifiers 55 and 56 are also supplied from the same alternating-current source of supply. Accordingly, a change in the polarity of the potential applied to the grid of the tube 44 will cause, as hereinafter appears, a change in the relative conductivity of the grid-controlled rectifiers 55 and 56. There is provided in the anode or output circuit of the rectifier 55 a resistor 64 shunted by a capacitor 65. A similar resistor 66, shunted by a capacitor 67, is connected in the anode or output circuit of the rectifier 56. The conductors 35 and 36 are connected to the respective ends of resistors 64 and 66 remote from their juncture with the cathode conductor 51. The operation will be thoroughly understood by reference to assumed conditions.

It will first be assumed that the thermocouple 10, by reason of the temperature to which it is subjected, produces a potential difference which requires the electron beam 32 to be in a position corresponding with zero potential difference between the deflecting plates 31. This will ordinarily be with the beam 32 in a central position within the tube 12. If the temperature of the thermocouple 10 decreases, the potential difference developed by the thermocouple 10 will decrease. The vibrator contact 40 effectively converts the direct-current potential difference into an alternating-current input signal to the grid of the vacuum tube 44 whose phase is determined by the relative magnitudes of the potential difference of the thermocouple 10 with reference to that developed in the resistor 11. Accordingly, when this potential difference is in one direction, the phase of the input signal to the tube 44 will be in one direction with reference to the anode voltages applied by way of transformers 61 and 62, and when that potential difference is in the opposite direction the phase will be reversed. The grid-controlled rectifiers 55 and 56 have their polarity so selected that when the temperature of the thermocouple 10 decreases, the conductors 35 and 36 apply a potential to the deflecting plates 31 of a polarity which moves the beam 32 to the left.

Conversely, when the temperature of the thermocouple 10 increases the conductors 35 and 36 apply a potential to the deflecting plates 31 of opposite polarity, thereby to move the beam 32 to the right. The extent of movement of the beam 32 depends upon the magnitude of the potential applied to the deflecting plates 31. Thus, it will be seen that any change of voltage or potential difference from the thermocouple 10 will immediately cause deflection of the beam 32 in sense to effect a balancing adjustment of resistor 11. The amplifier 38 has high gain; for example, $10^6$. It requires only a small change in direct-current voltage at its input to produce a change in the deflection of the electron beam. Since this is a feedback type of measurement, high accuracy is inherent in the system. For example, a change of one microvolt input will produce a change of 0.1% of full deflection of the beam position. If the range of the element 11 in tube 12 were one millivolt, then the accuracy of the measurement would be 0.1%; or if the range of element 11 were ten millivolts, the accuracy of measurement would be 0.01%.

It will be observed that with the beam 32 in the position illustrated, a smaller amount of resistance is included in the circuit than with the beam 32 deflected to a position adjacent the right-hand end of resistor 11. In order that a constant current shall flow through the resistor 11 for each position of the electron beam 32 with respect thereto, the intensity of the beam 32 is automatically controlled by varying the potential applied to the control electrode 16 with reference to the cathode 15. The controlling effect is such as to maintain constant the current flow in the resistor 11 regardless of the position of the electron beam with respect thereto, and regardless of other factors tending to change its value. This is accomplished by including the resistor 34 in circuit with the electron beam 32. The value of the resistor 34 is selected with reference to a standard cell 68. When the current in the resistor 11 is at its desired predetermined value, the potential across the resistor 34 is equal to that of the standard cell 68. Accordingly, a vibrator contact 69 of a single-pole double-contact switch operated by a coil 70 supplies through a coupling capacitor 71 zero signal or potential to the grid or input circuit of a vacuum tube 72. The vacuum tube 72 comprises the first stage of a two-stage amplifier 73, the output of which is connected by transformer 74 to a pair of grid-controlled rectifiers 75 and 76. The vibrator coil 70 is energized by way of capacitor 77 from a suitable source of alternating-current supply connected to supply lines 78, which also serve to energize the primary winding of a transformer 80 which has its secondary winding connected in the anode circuit of the grid-controlled rectifiers 75 and 76.

If the potential difference across the resistor 34 rises above that of the standard cell 68, the vibrator contact 69 by movement between contacts 79 and 81 applies through the capacitor 71 an input signal, the phase of which causes the rectifier 76 to be conductive so as to produce across the resistor 82 in its output circuit a potential drop of polarity which, through conductor 83 makes the control electrode 16 more negative with respect to the cathode 15 which, it will be observed, is connected by way of resistor 28, conductor 84, and resistor 85 to the other side of the resistor 32. The resistor 85, having a capacitor 86 in shunt therewith, performs a similar function for the rectifier tube 75 as the resistor 82 and its shunting capacitor 87a performs for the tube 76. In other words, when the potential difference across the resistor 34 is less than that of the standard cell 68, the phase of the voltage applied by way of capacitor 71 to the tube 72 causes the tube 75 to be conductive, thereby developing across the resistor 85 a potential difference which makes the control electrode 16 less negative or more positive with respect to the cathode 15.

As illustrated, a filter including inductors 87 and 88 and capacitors 89 and 90 is included in circuit with the standard cell 68 and the resistor 34, and serves to attenuate any alternating-current potentials which therein may appear. Accordingly, as the beam 32 is deflected from one position to another across the resistor 11, any change in the current intensity or magnitude through the resistor 11 is compensated for by the change in potential difference across the resistor 34. There is an immediate correction in the intensity of the beam 32 so that the current flowing through the resistor 11 is maintained constant at all times and at a value determined by the relative values of the voltage of the standard cell 68 and the resistance of resistor 34. The gain or amplification of the amplifier 73 insures that the current in the resistor 11 shall be maintained constant to within very narrow limits. The system maintains the electron-beam current constant if it tends to change for other causes, such as the result of line-voltage variations, aging of the tubes and the like.

The system as a whole provides for rapid balance of the measuring network for each change in temperature of the thermocouple 10 and balance is attained without time delay of any kind. The balancing occurs coincidentally with the unbalance. There are no slow moving parts, such as motor-driven or mechanically-actuated balancing slidewires. The system also lends itself to photographic recordation of the instantaneous position of the electron beam, which may sometimes be desirable if the condition under measurement is a rapidly varying one; that is, one which is varying so rapidly as to make it difficult, if not impossible, for an observer to read the instantaneous position with respect to the scale. By providing photographic means of conventional design, there may be recorded the instantaneous positions of the spot with respect to the scale.

In order that there may be simultaneously obtained an indication of the magnitude of the temperature to which the thermocouple 10 is subjected, the inner face of the tube 12 may be coated with a fluorescent material and alternating current may be supplied from a suitable source 91 to the plates 30 by way of conductors 92 and 93. The frequency of the source 91 is preferably much higher than that which supplies the lines 59 and 60. Any frequency from the source 91 introduced into the resistor 11 is eliminated by the filter between the resistor 11 and the vibrator contact 40. Only one of the plates 30 is visible, the other one being directly behind it as viewed in Fig. 1. The alternating potential applied to plates 30 causes the beam 32 to move laterally of the resistor 11 and slightly beyond it in the region of the scale 13. Accordingly, the fluorescent material between the resistor 11 and the scale 13, Fig. 2, is caused to glow and thus gives a direct indication on the scale 13 of the magnitude of the temperature to which the thermocouple 10 is subjected. By varying the magnitude of resistor 34, as by contact 34a, the small changes in the range of the measuring instrument may be made, but with corresponding changes in the intensity of the accompanying spot.

The range of the instrument for an optimum value of beam current is determined by the resistance of resistor 11. Where lower ranges are desired without change in value of resistor 11, they may be readily obtained by shunting resistor 11 with an external resistance.

In the modifications of Figs. 3 and 4, corresponding parts have been given the same reference characters and it is to be understood they perform the same or substantially the same functions as described in the systems of Figs. 1 and 2. In Fig. 3, the invention has been shown as applied to the measurement of a change in resistance of an element indicated by a variable resistor 94 connected in one arm of a Wheatstone bridge, the other arms of which include fixed resistors 95, 96, and 97, and the resistor 11 connected between corresponding ends of resistors 96 and 97. One side of the output circuit from the Wheatstone bridge comprises a conductor 98 leading from the juncture of resistors 95 and 96 to the midpoint of the primary winding of a transformer 99, while a conductor 100, connected from the juncture of resistors 94 and 97, leads to the vibrator contact 40 and forms the other side of said output circuit. In this case, the electron beam 32 not only supplies the potential for operation of the Wheatstone bridge, but it also variably divides the resistor 11 between the adjacent arms of the bridge, including the resistors 96 and 97, respectively. Any unbalance potential appearing between conductors 98 and 100 of one polarity produces in the secondary winding of transformer 99 an alternating current of predetermined phase with respect to that applied to the anode circuits of the rectifiers 55 and 56. A reversal of polarity of the unbalance potential reverses the relative polarity of the voltage applied to the grid circuit of the rectifiers 55 and 56 with reference to the phase of their anode voltages. The polarities and corresponding phase relations are so selected that an unbalance in one direction applies, by way of conductors 35 and 36, a potential to the deflecting plates 31 in a direction to deflect or move the beam 32 to a network or bridge-balancing position. Accordingly, the invention adapts itself to rapid measurement of potential, current, or resistance changes of substantially any character.

For some applications, it may be desirable to utilize a bridge supplied with alternating current, such, for example, as when measuring capacitance. For example, in Fig. 4, the Wheatstone bridge has been illustrated with a variable capacitor 101 in one arm thereof and a fixed capacitor 102 in another arm thereof. Since alternating current is applied to the Wheatstone bridge, the vibrator is no longer required and the transformer 99 serves to connect the input or grid circuit of the tube 44a across the diagonals of the bridge, including conductors 98 and 100. The filter, comprising the inductors 46a and 47a and the capacitors 48a and 49a, is of the bandpass type. It passes only the frequencies from the alternating-current source 103 and eliminates higher frequencies, as from the source 91.

In order to apply alternating current to the Wheatsone bridge, the secondary winding of a transformer 105 is included in circuit with the control electrode 16, the primary winding of the transformer being energized through a capacitor 106 to the alternating-current source 103. Accordingly, the alternating-current potential on the control electrode 16 will cause the intensity of the beam 32 to vary in accordance with the alternating-current potential. Thus, the beam 32 is utilized not only to balance the bridge in manner already described in connection with Fig. 3, but also to supply the bridge with a periodically varying current.

While preferred embodiments of the invention have been described, it will be understood that further modifications may be made within the spirit and scope of the invention as set forth in the appended claims.

What is claimed is:

1. A measuring system including a balanceable network having an elongated impedance mounted as a target in an electron-beam tube, said tube having a cathode and associated electrodes for producing a beam directed toward said impedance, deflecting means for moving said electron beam relative to said impedance, means interconnecting said cathode and said impedance for flow of current through a portion of said impedance by way of said electron beam, condition-responsive means for unbalancing said network, means for deriving from said network an alternating current of a predetermined frequency, grid-controlled rectifiers having input and output circuits, means supplying said output circuits with alternating currents of said predetermined frequency, means for applying said alternating current produced by unbalance of said network to said input circuits of said rectifiers to render one of them more conductive than the other as the phase relation of the alternating current applied to said input circuit varies with respect to that of said output circuits, and means operable as one rectifier becomes more conductive than the other to move said electron beam with respect to said impedance to balance said network.

2. A measuring system including a balanceable network having an elongated impedance mounted as a target in an electron-beam tube, said tube having a cathode and associated electrodes for producing a beam directed toward said impedance, deflecting means for moving said electron-beam relative to said impedance, means interconnecting said cathode and said impedance for flow of current through a portion of said impedance by way of said electron beam, condition-responsive means for unbalancing said network, means for converting said unbalance of said network into an alternating current of a given frequency, grid-controlled rectifiers having input and output circuits, means supplying said output circuits with alternating currents of said given frequency, means for applying said alternating current produced by unbalance of said network to said input circuits of said rectifiers to render one of them more conductive than the other as the phase relation of the alternating current applied to said input circuits varies with respect to that of said output circuits, and means operable as one rectifier becomes more conductive than the other to move said electron beam with respect to said impedance to balance said network.

3. An indicating system comprising an electron-beam tube, a resistor extending across the tube to serve as a target for the beam, means for deflecting the beam lengthwise of said resistor, a scale extending parallel to and spaced from an edge of said resistor, and means for vibrating the beam crosswise of and beyond said edge of said resistor to provide a visible marker coacting with said scale.

4. A balanceable network including at least one elongated impedance mounted as a target in an electron-beam tube, means operable in a direction to unbalance said network, amplifying means having an input circuit to which unbalance of said network is applied and an output circuit, beam-deflecting means controlled by said output circuit for positioning said electron beam on said impedance to include in an arm of said network a network-balancing value of said impedance, a scale extending along one edge of said impedance, and means for vibrating the beam crosswise of and beyond the edge of said elongated impedance to provide a visible index coacting with said scale.

5. A balanceable network including an elongated resistor serving as the beam-target of an electron-beam tube, a high-gain amplifier, means for impressing upon the input circuit of said amplifier an alternating voltage whose phase with respect to a reference voltage is dependent upon the sense of unbalance of said network, and means, including a rectifier system supplied from the source of said reference voltage and included in the output system of said amplifier, for effecting deflection of said beam in sense to restore balance of said network.

6. A measuring system comprising an alternating-current balanceable network including an impedance of magnitude varying with the magnitude of a condition, a resistor in circuit therewith and serving as the beam-target of an electron-beam tube, and a source of alternating current connected to said impedances; a high-gain amplifier upon which is impressed an alternating voltage whose phase with respect to the voltage of said source is dependent upon the sense of unbalance of said network, and means for effecting deflection of said beam in sense to effect a rebalancing adjustment of said resistor comprising a rectifier system energized from said source and included in the output system of said amplifier.

7. A measuring system comprising a direct-current balanceable network including means for producing a direct-current voltage varying with the magnitude of a condition, a resistor in series therewith and serving as the beam-target in an electron-beam tube, and a source of direct current for the beam and said resistor poled to produce a voltage in opposition to said first-named voltage; a high-gain amplifier having input and output circuits, means for impressing on the input circuit of said amplifier an alternating voltage whose phase with respect to a reference voltage is dependent upon the relative magnitudes of said opposed direct-current voltages, and means for effecting deflection of said beam in sense to effect a rebalancing of said resistor comprising a rectifier system energized from the source of said reference voltage and included in the output circuit of said amplifier.

8. A measuring system comprising a network including an elongated impedance disposed within an electron-beam tube, a power supply circuit extending between the cathode of said electron-beam tube and said network for flow of electron-beam current through said impedance, said network being balanceable by change in position of said beam with respect to said impedance, means for unbalancing said network in response to variations in the magnitude of a condition, amplifying means having an input circuit responsive to unbalance of said network and an output circuit, and beam-deflecting means connected to said output circuit and located at said electron-beam tube for moving said beam to a network-balancing position with respect to said impedance.

9. A measuring system comprising a network including an elongated impedance disposed within an electron-beam tube, a power supply circuit extending between the cathode of said electron-beam tube and said network for flow of electron-beam current through said impedance, said network being balanceable by change in position of said beam with respect to said impedance, means for unbalancing said network in response to variations in the magnitude of a condition, amplifying means having an input circuit responsive to unbalance of said network and an output circuit, beam-deflecting means connected to said output circuit and located at said electron-beam tube for moving said beam to a network-balancing position with respect to said impedance, and a scale associated with said impedance for indication of the deflection of said beam relative to said impedance.

10. A balanceable network including an elongated resistor mounted as the target for an electron-beam tube, circuit connections for flow of electron-beam current through a fraction of said resistor to introduce a first potential difference in said network, means connected to said network and including a device responsive to the magnitude of a condition for introducing into said network a second potential difference opposing said first potential difference, an electronic amplifier having an input circuit responsive to the difference between said potential differences for producing an output whose magnitude varies with change in said difference, and beam-deflecting means operable by said output for moving said electron beam along said resistor to change the fraction of said resistor included in said circuit connections until said first potential difference balances said second potential difference, said circuit connections including a constant-current system for maintaining with change in said beam relative to said resistor a substantially constant value the magnitude of said electron-beam current flowing through said fraction of said resistor.

11. A balanceable network including an elongated resistor mounted as the target for an electron-beam tube, circuit connections for flow of electron-beam current through a fraction of said resistor to introduce a first potential difference in said network having a value dependent upon the product of the current through said resistor and the resistance of said fraction, means connected to said network and including a device responsive to the magnitude of a condition for introducing into said network a second potential difference opposing said first potential difference, means responsive to potential unbalance of said network and including beam-deflecting means at said tube for moving said electron beam along said resistor to change the fraction of said resistor included in said circuit connections until said first potential difference balances said second potential difference, current-regulating means included in said circuit connections for maintaining said electron-beam current constant for all fractional values of said resistor included in said circuit connections by movement of said beam relative to said resistor, and a scale associated with said resistor for indicating the extent of deflection of said beam relative to said resistor to balance said network.

12. A measuring system including a balanceable network having in at least one arm thereof an elongated impedance mounted as a target in an electron-beam tube, a circuit including the cathode of said tube for flow of current through said impedance and to the cathode by way of the electron beam produced in said tube, means connected to said network and operable in a direction to unbalance said network, and amplifying means having an input circuit responsive to unbalance of said network and including in its output circuit beam-deflecting means for positioning said electron beam with respect to said impedance variably to include in said arm of said network that fraction of said impedance which for the current flowing therethrough will rebalance said network.

13. A measuring system including a balanceable network having in at least one arm thereof an elongated impedance mounted as a target in an electron-beam tube, a circuit including the cathode of said tube for flow of current through said impedance and to the cathode by way of the electron beam produced in said tube, means connected to said network and operable in a direction to unbalance said network, amplifying means having an input circuit responsive to unbalance of said network and including in its output circuit beam-deflecting means for positioning said electron beam with respect to said impedance variably to include in said arm of said network that fraction of said impedance which for the current flowing therethrough will rebalance said network, a scale associated with said impedance, and deflecting means associated with said tube for deflecting said beam transversely of said elongated impedance to produce an indication on said scale of the position of said beam with respect to said impedance.

14. A measuring system including a balanceable network having in at least one arm thereof an elongated impedance mounted as a target in an electron-beam tube, a circuit including the cathode of said tube for flow of current through said impedance and to the cathode by way of the electron beam produced in said tube, means connected to said network and operable in a direction to unbalance said network, amplifying means having an input circuit responsive to unbalance of said network and including in its output circuit beam-deflecting means for positioning said electron beam with respect to said impedance variably to include in said arm of said network that fraction of said impedance which for the current flowing therethrough will rebalance said network, a control electrode for said tube, and means for periodically varying the potential on said control electrode to apply to said network an alternating current.

15. A measuring system including a balanceable network having in at least one arm thereof an elongated impedance mounted as a target in an electron-beam tube, a circuit including the cathode of said tube for flow of current through said impedance and to the cathode by way of the electron beam produced in said tube, means connected to said network and operable in a direction to unbalance said network, amplifying means having an input circuit responsive to unbalance of said network and including in its output circuit beam-deflecting means for positioning said electron beam with respect to said impedance variably to include in said arm of said network that fraction of said impedance which for the current flowing therethrough will rebalance said network, a scale extending along one side of said impedance, means associated with said tube for deflecting said beam transversely of said elongated impedance to produce an indication on said scale of the position of said beam with respect to said impedance, and means including a control electrode in said tube for periodically varying the potential on said control electrode to apply to said network an alternating current.

WILLIAM RUSSELL CLARK.

REFERENCES CITED

The following references are of record in the file of this patent:

UNITED STATES PATENTS

| Number | Name | Date |
| --- | --- | --- |
| 2,357,205 | Keller | Aug. 29, 1944 |
| 2,357,922 | Ziebolz | Sept. 12, 1944 |
| 2,374,666 | Cunniff | May 1, 1945 |
| 2,394,196 | Morgan | Feb. 5, 1946 |
| 2,441,269 | Hartig | May 11, 1948 |
| 2,465,277 | Schafer | Mar. 22, 1949 |